(12) United States Patent
Chen et al.

(10) Patent No.: US 12,479,725 B2
(45) Date of Patent: Nov. 25, 2025

(54) BIS(FLUOROSULFONYL)IMIDE IMPURITY REMOVAL AND PURIFICATION SYSTEM AND BIS(FLUOROSULFONYL)IMIDE IMPURITY REMOVAL AND PURIFICATION METHOD

(71) Applicants: Morimatsu (Jiangsu) Heavy Industry Co., Ltd., Rugao (CN); Shanghai Morimatsu Engineering Technology Co., LTD, Shanghai (CN)

(72) Inventors: Hongwei Chen, Rugao (CN); Sheng Xu, Rugao (CN); Lurong Mao, Rugao (CN); Zhenxing Li, Rugao (CN); Koei Nishimatsu, Rugao (CN)

(73) Assignees: Morimatsu (Jiangsu) Heavy Industry Co., Ltd., Rugao (CN); Shanghai Morimatsu Engineering Technology Co., LTD, Shanghai (CN)

( * ) Notice: Subject to any disclaimer, the term of this patent is extended or adjusted under 35 U.S.C. 154(b) by 0 days.

(21) Appl. No.: 18/860,885

(22) PCT Filed: Mar. 2, 2023

(86) PCT No.: PCT/CN2023/079354
§ 371 (c)(1),
(2) Date: Oct. 28, 2024

(87) PCT Pub. No.: WO2024/113523
PCT Pub. Date: Jun. 6, 2024

(65) Prior Publication Data
US 2025/0109019 A1    Apr. 3, 2025

(30) Foreign Application Priority Data
Dec. 1, 2022   (CN) .................. 202211525563.3

(51) Int. Cl.
*C01B 21/093*   (2006.01)
*B01D 1/02*     (2006.01)
(Continued)

(52) U.S. Cl.
CPC .............. *C01B 21/093* (2013.01); *B01D 1/22* (2013.01); *B01D 5/006* (2013.01); *C01B 21/086* (2013.01);
(Continued)

(58) Field of Classification Search
None
See application file for complete search history.

(56) References Cited

U.S. PATENT DOCUMENTS

2020/0331754 A1    10/2020  Luly et al.
2021/0179428 A1*    6/2021  Luly ........................ B01D 3/14
2024/0391774 A1*   11/2024  Schmitt ............. H01M 10/0568

FOREIGN PATENT DOCUMENTS

CN    112739646 A    4/2021
CN    113603069 A   11/2021
(Continued)

OTHER PUBLICATIONS

Translation for Xu et al. (CN 115304039 A), publication date Nov. 8, 2022. (Year: 2022).*
(Continued)

*Primary Examiner* — Jennifer A Leung
(74) *Attorney, Agent, or Firm* — Grossman, Tucker, Perreault & Pfleger, PLLC

(57) ABSTRACT

The invention provides a bis(fluorosulfonyl)imide impurity removal and purification system and a bis(fluorosulfonyl) imide impurity removal and purification method. The system comprises a light-component stripping tank, a gas-liquid separator, a product buffer tank, an impurity removal reactor, and a film evaporator. The light-component stripping tank is
(Continued)

connected to a reaction product liquid supply source. The gas-liquid separator is connected to the light-component stripping tank and also connected to the light-component product recovery device. The product buffer tank is connected to the light-component stripping tank and also connected to the gas-liquid separator. The impurity removal reactor is connected to the product buffer tank and also connected to an impurity removal reactant supply source. The film evaporator is connected to the impurity removal reactor, connected to a gas-phase separation system, and also connected to an impurity collection tank. The bis(fluorosulfonyl)imide impurity removal and purification system and the bis(fluorosulfonyl)imide impurity removal and purification method according to the invention make it possible to remove impurities from bis(fluorosulfonyl)imide continuously and efficiently and purify it.

8 Claims, 2 Drawing Sheets

(51) Int. Cl.
*B01D 1/22* (2006.01)
*B01D 5/00* (2006.01)
*C01B 21/086* (2006.01)
*H01M 10/052* (2010.01)

(52) U.S. Cl.
CPC ....... *C01B 21/0935* (2013.01); *H01M 10/052* (2013.01)

(56) References Cited

FOREIGN PATENT DOCUMENTS

| | | |
|---|---|---|
| CN | 113912028 A | 1/2022 |
| CN | 115304039 A | 11/2022 |
| CN | 115676784 A | 2/2023 |
| JP | 2017218328 A | 12/2017 |

OTHER PUBLICATIONS

International Search Report and Written Opinion from PCT Application No. PCT/CN2023/079354 dated Jul. 7, 2023. (6 Pages) (English translation attached).

* cited by examiner

BIS(FLUOROSULFONYL)IMIDE IMPURITY REMOVAL AND PURIFICATION SYSTEM AND BIS(FLUOROSULFONYL)IMIDE IMPURITY REMOVAL AND PURIFICATION METHOD

The present application claims priority to Chinese Patent Application No. 202211525563.3, filed on Dec. 1, 2022, the entire contents of which are incorporated herein by reference.

TECHNICAL FIELD

The invention relates to a bis(fluorosulfonyl)imide impurity removal and purification system and a bis(fluorosulfonyl)imide impurity removal and purification method, and in particular to a bis(fluorosulfonyl)imide impurity removal and purification system and a bis(fluorosulfonyl)imide impurity removal and purification method which can remove impurities from bis(fluorosulfonyl)imide continuously and efficiently and purify it during the preparation of bis(fluorosulfonyl)imide.

BACKGROUND

Considering battery costs, safety performance and the like, lithium hexafluorophosphate ($LiPF_6$) is at present the most widely used solute lithium salt in commercial lithium batteries. However, the main problem of lithium hexafluorophosphate as the electrolyte is its unfavorable thermal stability and moisture stability. Therefore, new materials still has been sought in the lithium battery industry to optimize the performance of electrolytes. Lithium bis(fluorosulfonyl)imide, as an electrolyte additive for lithium ion batteries, has the advantages of high conductivity, high chemical stability and high thermal stability and is promising in replacing lithium hexafluorophosphate, and it will become the core competitiveness of electrolyte enterprises in the high-nickel era.

Lithium bis(fluorosulfonyl)imide (LiFSI), as an electrolyte additive of a new generation, has the advantages of high conductivity, high chemical stability and high thermal stability. It is a novel lithium salt that can replace lithium hexafluorophosphate in the future and is currently a research hotspot in the market. However, compared with the preparation of lithium hexafluorophosphate, the preparation of lithium bis(fluorosulfonyl)imide has to go through a complex path. Also, by-products are prone to being generated during the reaction process. It is thus difficult to industrially produce lithium bis(fluorosulfonyl)imide in large quantities. Bis(fluorosulfonyl)imide is an important raw material for preparing lithium bis(fluorosulfonyl)imide and the reaction raw material at the salt-forming stage, and its purity directly determines the ultimate purity of lithium bis(fluorosulfonyl)imide. During the production of bis(fluorosulfonyl)imide, the by-products include fluorosulfonic acid, among other impurities. Fluorosulfonic acid needs to be removed by introducing a sodium salt to form the solid sodium fluorosulfonate. Conventional impurity removal methods in the prior art (e.g., the impurity removal method disclosed in CN113603069A which utilizing filtration to remove impurities) have certain limitations and cannot easily remove all solids generated during the production of bis(fluorosulfonyl)imide, and thus will adversely influence the quality of the product.

The invention aims to provide a bis(fluorosulfonyl)imide impurity removal and purification system and a bis(fluorosulfonyl)imide impurity removal and purification method, which can remove impurities from bis(fluorosulfonyl)imide continuously and efficiently and purify it.

SUMMARY

The invention provides a bis(fluorosulfonyl)imide impurity removal and purification system, which comprises a light-component stripping tank, a product buffer tank, an impurity removal reactor, and a film evaporator, wherein the light-component stripping tank is connected to a reaction product liquid supply source via a reaction product liquid conveying pipe and also connected to a light-component product recovery device via a light-component product recovery pipe; the product buffer tank is connected to the light-component stripping tank via a first heavy-component product conveying pipe; the impurity removal reactor is connected to the product buffer tank via a third heavy-component product conveying pipe and also connected to an impurity removal reactant supply source via an impurity removal reactant conveying pipe; and the film evaporator is connected to the impurity removal tank reactor via a product liquid conveying pipe, connected to a gas-phase separation system via a gas-phase product conveying pipe, and also connected to an impurity collection tank via an impurity conveying pipe, and wherein after a reaction liquid supplied from the reaction product liquid supply source to the light-component stripping tank is subject to heating evaporation treatment, a light component product is conveyed to the light-component product recovery device via the light-component product recovery pipe, while a heavy-component product in the reaction liquid is conveyed to the product buffer tank via the first heavy-component product conveying pipe; a product liquid in the product buffer tank is conveyed to the impurity removal tank reactor via the third heavy-component product conveying pipe and undergoes an impurity removal reaction with an impurity removal reactant from the impurity removal reactant supply source conveyed via the impurity removal reactant conveying pipe; the product liquid having undergone the impurity removal reaction is conveyed to the film evaporator via the product liquid conveying pipe to undergo a film evaporation treatment, a gas-phase product obtained after the film evaporation treatment is conveyed to the gas-phase separation system via the gas-phase product conveying pipe, and a solid-containing slurry left by the film evaporation treatment is conveyed to the impurity collection tank via the impurity conveying pipe.

Preferably, the system further comprises a gas-liquid separator, wherein the gas-liquid separator is connected to the light-component stripping tank via a conveying pipe for target product of separation and also connected to the light-component product recovery device via the light-component product recovery pipe; the product buffer tank is connected to the light-component stripping tank via the first heavy-component product conveying pipe and also connected to the gas-liquid separator via the second heavy-component product conveying pipe, and wherein after a reaction liquid supplied from the reaction product liquid supply source to the light-component stripping tank is subject to heating evaporation treatment, a target product of separation in the reaction liquid is conveyed to the gas-liquid separator via the conveying pipe for target product of separation, while a heavy-component product in the reaction liquid is conveyed to the product buffer tank via the first heavy-component product conveying pipe; after the target product of separation conveyed to the gas-liquid separator is subject to gas-liquid separation treatment in the gas-liquid separator, a light component product is conveyed to the light-component product recovery device via the light-component product recovery pipe, while a heavy-component product is conveyed to the product buffer tank via the second heavy-component product conveying pipe.

Preferably, the bis(fluorosulfonyl)imide impurity removal and purification system according to the invention further comprises a steam supply source connected to the light-component stripping tank via a steam supply pipe, wherein the light-component stripping tank subjects the reaction liquid to heating evaporation treatment by introducing steam from the steam supply source into a pipe of the light-component stripping tank and a gas phase temperature of the light-component stripping tank is subject to interlock control by a regulating valve arranged on the steam supply pipe and a temperature sensor arranged on the light-component stripping tank.

Preferably, an internal temperature of the product buffer tank is maintained at a temperature higher than the freezing point of bis(fluorosulfonyl)imide during product storage.

Preferably, the third heavy-component product conveying pipe is provided with a conveying pump which continuously adds a product liquid in the product buffer tank to the impurity removal tank reactor and a flow rate of the product liquid added to the impurity removal tank reactor is subjected to interlock control by a regulating valve and a flowmeter that are arranged on the third heavy-component product conveying pipe.

Preferably, the impurity removal tank reactor is provided with a jacket capable of steam introduction, wherein an amount of steam introduced into the jacket of the impurity removal reactor is subject to interlock control by a regulating valve arranged on the steam supply pipe and a temperature sensor arranged on the impurity removal tank reactor so that a temperature of the impurity removal reaction is controlled.

Preferably, a regulating valve is arranged on a steam supply pipe via which the film evaporator is connected to a steam heat source, wherein a temperature of a gas phase outlet of the film evaporator is controlled by adjusting the degree of opening of the regulating valve.

Preferably, the film evaporator is vacuumed during whole film evaporation treatment.

The invention also provides a bis(fluorosulfonyl)imide impurity removal and purification method, which is a method using the above bis(fluorosulfonyl)imide impurity removal and purification system to remove an impurity from and purify bis(fluorosulfonyl)imide, comprising:

a heating evaporation treatment step of evaporating and removing a light component product in a reaction liquid and collecting a heavy-component product;

an impurity removal reaction step of generating an impurity-containing substance by reacting an impurity removal reactant with the reaction liquid; and a film evaporation treatment step of subjecting a product liquid having undergone the impurity removal reaction to film evaporation treatment to obtain a gas-phase product and recover the impurity.

Preferably, the method further comprises a gas-liquid separation treatment step of recovering a heavy-component product entrained from the heating evaporation treatment step.

The bis(fluorosulfonyl)imide impurity removal and purification system and the bis(fluorosulfonyl)imide impurity removal and purification method according to the invention make it possible to remove impurities from bis(fluorosulfonyl)imide continuously and efficiently and purify it.

Figure 1:
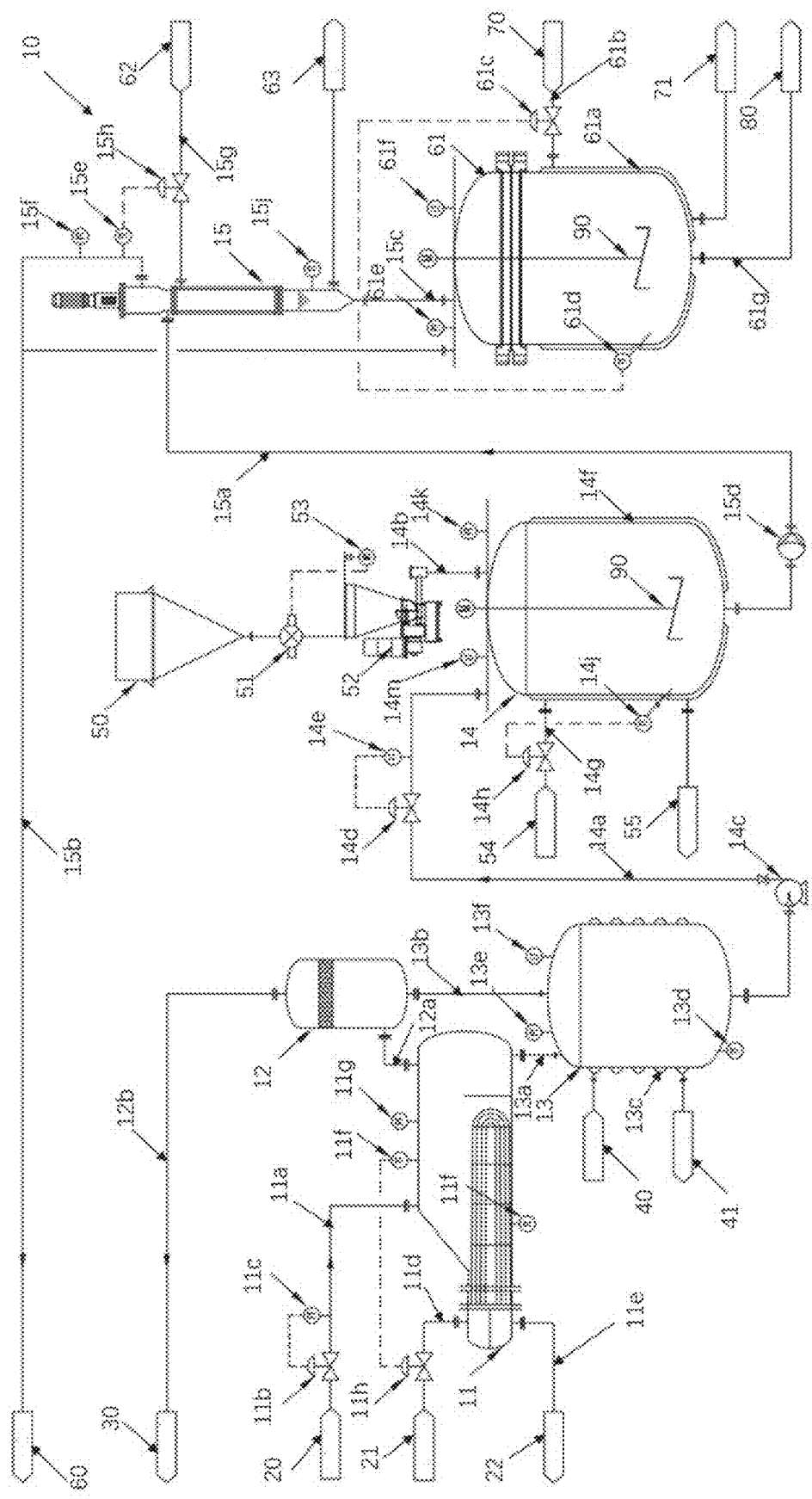
FIG. 1 shows a schematic diagram of a bis(fluorosulfonyl)imide impurity removal and purification system according to the invention.

In the drawings, 10 denotes a bis(fluorosulfonyl)imide impurity removal and purification system, 11 denotes a light-component stripping tank, 12 denotes a gas-liquid separator, 13 denotes a product buffer tank, 14 denotes an impurity removal reactor, and 15 denotes a film evaporator.

DETAILED DESCRIPTION

The technical solution and effect of the invention will be described in detail by means of embodiments. The following embodiments are only used to explain the invention, and the invention is not limited to the following embodiments or examples. Simple modifications of the invention using the inventive concept of the invention fall within the scope of protection of the invention.

As shown in FIG. 1, a bis(fluorosulfonyl)imide impurity removal and purification system 10 according to the invention comprises a light-component stripping tank 11, a gas-liquid separator 12, a product buffer tank 13, an impurity removal reactor 14, and a film evaporator 15.

The light-component stripping tank 11 is connected to a fluorination reactor 20 serving as a reaction product liquid supply source via a reaction product liquid conveying pipe 11a. A regulating valve 11b and a flowmeter 11c are provided on the reaction product liquid conveying pipe 11a. The light-component stripping tank 11 is connected to a steam heat source 21 as a steam supply source via a steam supply pipe 11d and connected to a condensed water recovery device 22 via a condensed water recovery pipe 11e. The light-component stripping tank 11 is provided with a temperature sensor 11f (two of which are provided in this embodiment) for detecting the temperature in the light-component stripping tank 11 and a pressure sensor 11g for detecting the pressure in the light-component stripping tank 11. The steam supply pipe 11d is further provided with a regulating valve 11h.

The gas-liquid separator 12 is connected to the light-component stripping tank 11 via a conveying pipe for target product of separation 12a and also connected to a light-component product recovery device 30 via a light-component product recovery pipe 12b.

The product buffer tank 13 is connected to the light-component stripping tank 11 via a first heavy-component product conveying pipe 13a and also connected to the gas-liquid separator 12 via a second heavy-component product conveying pipe 13b. The product buffer tank 13 is provided with a jacket 13c. The jacket 13c is connected to a steam heat source 40 and a condensed water recovery device 41. The product buffer tank 13 is provided with a temperature sensor 13d for detecting the temperature in the product buffer tank 13, a pressure sensor 13e for detecting the pressure in the product buffer tank 13, and a liquid height gauge 13f for detecting the liquid height in the product buffer tank 13.

The impurity removal reactor 14 is connected to the product buffer tank 13 via a third heavy-component product conveying pipe 14a and also connected to a sodium salt bin 50 as an impurity removal reactant supply source via a impurity removal reactant conveying pipe 14b. The third heavy-component product conveying pipe 14a is provided with a conveying pump 14c, a regulating valve 14d, and a flowmeter 14e. The impurity removal reactant conveying pipe 14b is provided with a rotary valve 51 and a loss-in-weight feeder 52. The loss-in-weight feeder 52 is provided with a weighing sensor 53. The impurity removal reactor 14 is provided with a jacket 14f connected to a steam heat source 54 and a condensed water recovery device 55. A steam pipe 14g connecting the jacket 14f and the steam heat source 54 is provided with a regulating valve 14h. Further, the impurity removal reactor 14 is provided with a temperature sensor 14j for detecting the temperature in the impurity removal tank reactor 14, a pressure sensor 14k for detecting the pressure in the impurity removal reactor 14, and a liquid height gauge 14m for detecting the liquid height in the impurity removal tank reactor 14.

The film evaporator 15 is connected to the impurity removal reactor 14 via a product liquid conveying pipe 15a, connected to a gas-phase separation system 60 via a gas-phase product conveying pipe 15b, and connected to an impurity collection tank 61 via an impurity conveying pipe 15c. The product liquid conveying pipe 15a is provided with a metering pump 15d. The gas-phase product conveying pipe 15b is provided with a temperature sensor 15e and a pressure sensor 15f. The film evaporator 15 is connected to a steam heat source 62 and a condensed water recovery device 63, and a steam pipe 15g connecting the film evaporator 15 and the steam heat source 62 is provided with a regulating valve 15h. The film evaporator 15 is also provided with a temperature sensor 15j. The impurity collection tank 61 is provided with a jacket 61a connected to a steam heat source 70 and a condensed water recovery device 71, and a steam pipe 61b connecting the jacket 61a and the steam heat source 70 is provided with a regulating valve 61c. Further, the impurity collection tank 61 is provided with a temperature sensor 61d for detecting the temperature in the impurity collection tank 61, a pressure sensor 61e for detecting the pressure in the impurity collection tank 61, and a liquid height gauge 61f for detecting the liquid height in the impurity collection tank 61. The impurity collection tank 61 is also connected to a solid residue discharge device 80 via a solid residue discharge pipe 61g provided at the bottom of the impurity collection tank 61.

In addition, the impurity removal reactor 14 and the impurity collection tank 61 are each provided with an agitator 90 inside.

There is hereinafter a description of a process (i.e., an impurity removal and purification method) for removing an impurity from and purify bis(fluorosulfonyl)imide using the bis(fluorosulfonyl)imide purity removal and purification system 10 described above.

The invention provides a bis(fluorosulfonyl)imide impurity removal and purification method which comprises a heating evaporation treatment step, a gas-liquid separation treatment step, an impurity removal reaction step, and a film evaporation treatment step.

In the heating evaporation treatment step, a reaction liquid is first supplied from the fluorination reactor 20 to the light-component stripping tank 11, and the amount of the reaction liquid continuously supplied from the fluorination reactor 20 to the light-component stripping tank 11 is subject to interlock control by the regulating valve 11b and the flowmeter 11c. After the reaction liquid is subject to heating evaporation treatment in the light-component stripping tank 11, a target product of separation in the reaction liquid is conveyed to the gas-liquid separator 12 via the conveying pipe for target product of separation 12a, while the heavy-component product in the reaction liquid is conveyed to the product buffer tank 13 via the first heavy component conveying pipe 13a. In this step, the light-component stripping tank 11 subjects the reaction liquid to heating evaporation treatment by introducing steam from the steam heat source 21 into a pipe of the light-component stripping tank 11 and the gas phase temperature of the light-component stripping tank 11 is subject interlock control by the regulating valve 11h arranged on the steam supply pipe 11d and the temperature sensor 11f arranged on the light-component stripping tank 11.

In the gas-liquid separation treatment step, after the target product of separation that has been conveyed to the gas-liquid separator 12 is subject to gas-liquid separation treatment in the gas-liquid separator 12, the light component product is conveyed to the light-component product recovery device 30 via the light-component product recovery pipe 12b, while the heavy component product is conveyed to the product buffer tank 13 via the second heavy-component product conveying pipe 13b. The product buffer tank 13 maintains, during product storage, its temperature detected by the temperature sensor 13d at a temperature higher than the freezing point of bis(fluorosulfonyl)imide by introducing steam into the jacket 13c of the product buffer tank 13.

In the impurity removal reaction step, the product liquid in the product buffer tank 13 is continuously conveyed into the impurity removal reactor 14 by the conveying pump 14c via the third heavy-component product conveying pipe 14a, and undergoes an impurity removal reaction with a sodium salt as the impurity removal reactant from the sodium salt bin 50 conveyed via the impurity removal reactant conveying pipe 14b. In this step, the feed flow rate of the impurity removal reactor 14 is subject to interlock control by the regulating valve 14d and the flowmeter 14e. Meanwhile, the sodium salt for impurity removal is continuously fed into the loss-in-weight feeder 52 from the sodium salt bin 50 via the rotary valve 51, and then continuously added into the impurity removal reactor 14. At this time, the temperature of the impurity removal reaction is controlled by subjecting the amount of steam introduced into the jacket 14f of the impurity removal tank reactor 14 to interlock control by the regulating valve 14h and the temperature sensor 14j.

In the film evaporation treatment step, the reaction liquid is first conveyed quantitatively to the film evaporator 15 by the metering pump 15d, and the temperature of the gas phase outlet of the film evaporator 15 is controlled by adjusting the degree of opening of the regulating valve 15h. In addition, the film evaporator 15 is vacuumed during the whole film evaporation. The difluoride gas-phase product evaporated by the film evaporation treatment is conveyed to the gas-phase separation system 60 via the gas-phase product conveying pipe 15b, and the solid-containing slurry left by the film evaporation treatment is conveyed to the impurity collection tank 61 via the impurity conveying pipe 15c. The temperature in the impurity collection tank 61 is controlled by adjusting the degree of opening of the regulating valve 61c on the steam pipe 61b connected to the jacket 61a of the impurity collection tank 61.

The bis(fluorosulfonyl)imide impurity removal and purification system 10 and the bis(fluorosulfonyl)imide impurity removal and purification method according to the invention have the following advantages.
 (1) Light components entrained in the reaction liquid are first removed by the horizontal light-component stripping tank 11 and thus are avoided from entering subsequent steps. By using a horizontal light-component stripping tank, the residence time can be increased and the light-components can be removed completely.

(2) The gas-liquid separator 12 enables light components entrained in the reaction liquid to be recovered so as to use fewer resources.

(3) The film evaporator 15, because of its high heat transfer efficiency, enables the production of the difluoride gas-phase product with high quality. Since the film evaporator 15 is vacuumed during the whole film evaporation, the difluoride gas-phase product is more easily evaporated from the product liquid.

(4) Since the impurity removal and purification system performs the feeding and discharging continuously, it is possible to remove impurities from bis(fluorosulfonyl) imide continuously and efficiently and purify it.

Several sets of steam supply-circulation systems each of which comprises a steam heat source and a condensed water recovery device are employed in the example described above. Those steam heat sources and condensed water recovery devices can share one set of steam supply-circulation system.

Figure 2:
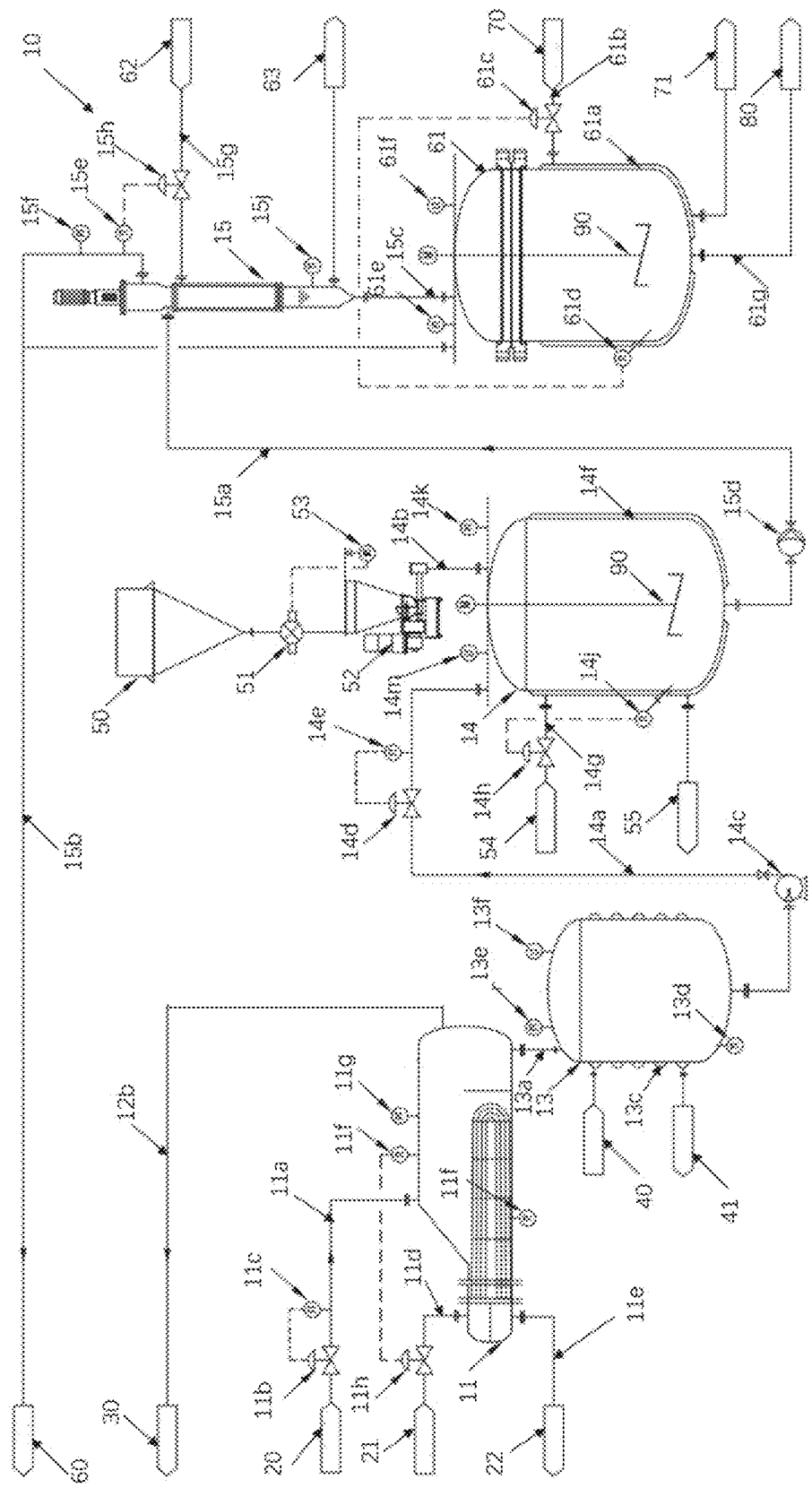
FIG. 2 shows a schematic diagram of a modified embodiment of a bis(fluorosulfonyl)imide impurity removal and purification system according to the invention.

As a variant of the example described above, the gas-liquid separator 12 can be omitted as shown in FIG. 2. In such a variant, the light-component stripping tank 11 is connected to the reaction product liquid supply source 20 via the reaction product liquid conveying pipe 11a and also connected to the light-component product recovery device 30 via the light-component product recovery pipe 12b. The product buffer tank is connected to the light-component stripping tank via the first heavy-component product conveying pipe. The impurity removal reactor is connected to the product buffer tank via the third heavy-component product conveying pipe and connected to the impurity removal reactant supply source via the impurity removal reactant conveying pipe. The film evaporator is connected to the impurity removal reactor via the product liquid conveying pipe, connected to the gas-phase separation system via the gas-phase product conveying pipe, and also connected to the impurity collection tank via the impurity conveying pipe. After the reaction liquid supplied from the reaction product liquid supply source to the light-component stripping tank is subject to the heating evaporation treatment, the light component product is conveyed to the light-component product recovery device via the light-component product recovery pipe, while the heavy-component product in the reaction liquid is conveyed to the product buffer tank via the first heavy-component product conveying pipe.

It should be noted that the specific technical features described in the above embodiment, unless contradicting each other, can be combined in any suitable way.

What is claimed is:

1. A bis(fluorosulfonyl)imide impurity removal and purification system, which comprises a light-component stripping tank, a product buffer tank, an impurity removal reactor, and a film evaporator, wherein the light-component stripping tank is connected to a reaction product liquid supply source via a reaction product liquid conveying pipe and also connected to a light-component product recovery device via a light-component product recovery pipe;

the product buffer tank is connected to the light-component stripping tank via a first heavy-component product conveying pipe;

the impurity removal reactor is connected to the product buffer tank via a third heavy-component product conveying pipe and also connected to an impurity removal reactant supply source via an impurity removal reactant conveying pipe; and the film evaporator is connected to the impurity removal reactor via a product liquid conveying pipe, connected to a gas-phase separation system via a gas-phase product conveying pipe, and also connected to an impurity collection tank via an impurity conveying pipe, and wherein after a reaction liquid supplied from the reaction product liquid supply source to the light-component stripping tank is subjected to heating evaporation treatment, a light component product is conveyed to the light-component product recovery device via the light-component product recovery pipe, while a heavy-component product in the reaction liquid is conveyed to the product buffer tank via the first heavy-component product conveying pipe;

a product liquid in the product buffer tank is conveyed to the impurity removal reactor via the third heavy-component product conveying pipe and undergoes an impurity removal reaction with an impurity removal reactant from the impurity removal reactant supply source conveyed via the impurity removal reactant conveying pipe;

the product liquid having undergone the impurity removal reaction is conveyed to the film evaporator via the product liquid conveying pipe to undergo a film evaporation treatment, a gas-phase product obtained after the film evaporation treatment is conveyed to the gas-phase separation system via the gas-phase product conveying pipe, and a solid-containing slurry left by the film evaporation treatment is conveyed to the impurity collection tank via the impurity conveying pipe.

2. The bis(fluorosulfonyl)imide impurity removal and purification system according to claim 1, further comprising a gas-liquid separator, wherein the gas-liquid separator is connected to the light-component stripping tank via a conveying pipe for target product of separation and also connected to the light-component product recovery device via the light-component product recovery pipe;

the product buffer tank is connected to the light-component stripping tank via the first heavy-component product conveying pipe and also connected to the gas-liquid separator via a the second heavy-component product conveying pipe, wherein after the reaction liquid supplied from the reaction product liquid supply source to the light-component stripping tank is subjected to heating evaporation treatment, a target product of separation in the reaction liquid is conveyed to the gas-liquid separator via the conveying pipe for target product of separation, while a heavy-component product in the reaction liquid is conveyed to the product buffer tank via the first heavy-component product conveying pipe;

after the target product of separation conveyed to the gas-liquid separator is subjected to gas-liquid separation treatment in the gas-liquid separator, a light component product is conveyed to the light-component product recovery device via the light-component product recovery pipe, while a heavy-component product is conveyed to the product buffer tank via the second heavy-component product conveying pipe.

3. The bis(fluorosulfonyl)imide impurity removal and purification system according to claim 1, further comprising a steam supply source connected to the light-component stripping tank via a steam supply pipe, wherein the light-component stripping tank subjects the reaction liquid to heating evaporation treatment by introducing steam from the steam supply source into a pipe of the light-component stripping tank, and a gas phase temperature of the light-component stripping tank is subject to interlock control by a regulating valve arranged on the steam supply pipe and a temperature sensor arranged on the light-component stripping tank.

4. The bis(fluorosulfonyl)imide impurity removal and purification system according to claim 1, wherein the third heavy-component product conveying pipe is provided with a conveying pump which continuously adds a product liquid in the product buffer tank to the impurity removal reactor, and a flow rate of the product liquid added to the impurity removal reactor is subjected to interlock control by a regulating valve and a flowmeter that are arranged on the third heavy-component product conveying pipe.

5. The bis(fluorosulfonyl)imide impurity removal and purification system according to claim 1, wherein the impurity removal reactor is provided with a jacket capable of steam introduction, and an amount of steam introduced into the jacket of the impurity removal reactor is subject to interlock control by a regulating valve arranged on the steam supply pipe and a temperature sensor arranged on the impurity removal tank reactor so that a temperature of the impurity removal reaction is controlled.

6. The bis(fluorosulfonyl)imide impurity removal and purification system according to claim 1, wherein a regulating valve is arranged on a steam supply pipe via which the film evaporator is connected to a steam heat source, and a temperature of a gas phase outlet of the film evaporator is controlled by adjusting the degree of opening of the regulating valve.

7. A bis(fluorosulfonyl)imide impurity removal and purification method, using the bis(fluorosulfonyl)imide impurity removal and purification system according to claim 1 to remove an impurity from bis(fluorosulfonyl)imide and purify it, comprising:
  carrying out in said light component stripping tank said heating evaporation treatment and evaporating and removing a light component product in a reaction liquid and collecting a heavy-component product;
  carrying out in said impurity removal reactor said impurity removal reaction and generating an impurity-containing substance by reacting an impurity removal reactant with the reaction liquid; and
  carrying out in said film evaporator said film evaporation treatment of said product liquid having undergone the impurity removal to obtain a gas-phase product and recover the impurity.

8. A bis(fluorosulfonyl)imide impurity removal and purification method, using the bis(fluorosulfonyl)imide impurity removal and purification system according to claim 2 to remove an impurity from bis(fluorosulfonyl)imide and purify it, comprising:
  carrying out in said light component stripping tank said heating evaporation treatment and evaporating and removing a light component product in a reaction liquid and collecting a heavy-component product;
  carrying out in said gas-liquid separator a gas-liquid separation and recovering a heavy-component product entrained from the heating evaporation treatment;
  carrying out in said impurity removal reactor an impurity removal reaction and generating an impurity-containing substance by reacting an impurity removal reactant with the reaction liquid; and
  carrying out in said film evaporator a film evaporation treatment step of subjecting a product liquid having undergone the impurity removal reaction to film evaporation treatment to obtain a gas-phase product and recover the impurity.

* * * * *